(12) United States Patent
Menashof et al.

(10) Patent No.: US 12,346,523 B1
(45) Date of Patent: Jul. 1, 2025

(54) SECURE TRANSMISSION OF TOUCH DATA USING A DEVICE-SPECIFIC CALIBRATION MAP

(71) Applicant: Microsoft Technology Licensing, LLC, Redmond, WA (US)

(72) Inventors: Roei Shlomo Menashof, Netanya (IL); Anatoly Tsvetov, Kfar-Yona (IL); Oren Istrin, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/754,506

(22) Filed: Jun. 26, 2024

(51) Int. Cl.
*G06F 3/041* (2006.01)

(52) U.S. Cl.
CPC .................. *G06F 3/0418* (2013.01)

(58) Field of Classification Search
CPC .................................................... G06F 3/0418
See application file for complete search history.

(56) References Cited

U.S. PATENT DOCUMENTS

| | | |
|---|---|---|
| 2004/0064711 A1 | 4/2004 | Fernando |
| 2006/0097991 A1 | 5/2006 | Hotelling et al. |
| 2012/0265981 A1 | 10/2012 | Moon et al. |
| 2013/0057506 A1 | 3/2013 | Hu |
| 2016/0162118 A1* | 6/2016 | Gur .............. G06F 3/0441 345/174 |
| 2021/0360453 A1 | 11/2021 | Kleinbeck |

FOREIGN PATENT DOCUMENTS

JP  2003233463 A  8/2003

OTHER PUBLICATIONS

Edn., "Aggressively combat noise in capacitive touch applications," retrieve from: https://www.edn.com/aggressively-combat-noise-in-capacitive-touch-applications/, Apr. 8, 2013, 11 pages.
Fang, Wendy., "Reducing Analog Input Noise in Touch Screen Systems," Texas Instruments Application Report, SBAA-155A, 2007, pp. 1-12.
Gao, et al., "Reduction of noise spikes in touch screen systems by low pass spatial filtering," Journal of Display Technology, Apr. 5, 2016, vol. 12, Issue No. 9, pp. 1-7.

* cited by examiner

*Primary Examiner* — Michael Pervan
(74) *Attorney, Agent, or Firm* — Holzer Patel Drenann

(57) ABSTRACT

A method for secure handling of touch data includes receiving touch data from a digitizer sensor in response to a user interaction with a touch surface; transmitting the touch data from a first processor of a digitizer system to a second processor of a host system without removing a noise signature of the digitizer sensor; accessing, by the second processor, a digitizer calibration map that includes the noise signature of the digitizer sensor; and substantially removing, by the second processor, the noise signature from the touch data based at least in part on the digitizer calibration map.

20 Claims, 5 Drawing Sheets

Uncalibrated Heat Map of Detected Touch Data

Calibrated Heat Map of Detected Touch Data

SECURE TRANSMISSION OF TOUCH DATA USING A DEVICE-SPECIFIC CALIBRATION MAP

BACKGROUND

Modern devices are often equipped with touch interfaces that receive user input by tracking locations that the user physically interacts with (touches) on a touch-sensing surface, such as a touch screen or a trackpad. The user may interact with the touch-sensing surface using finger(s) or a stylus, which may or may not be powered.

SUMMARY

Implementations described and claimed herein provide a method for securely transmitting touch data. The method comprises receiving touch data from a digitizer sensor that includes a noise signature unique to the digitizer sensor. The method further includes transmitting the touch data from a first processor of a digitizer system to a second processor of a host system without removing the noise signature; accessing, by the second processor, a digitizer calibration map that is usable to substantially remove the noise signature from the touch data; and removing, by the second processor, the noise signature from the touch data based at least in part on the digitizer calibration map.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to limit the scope of the claimed subject matter.

DETAILED DESCRIPTION

Figure 1:
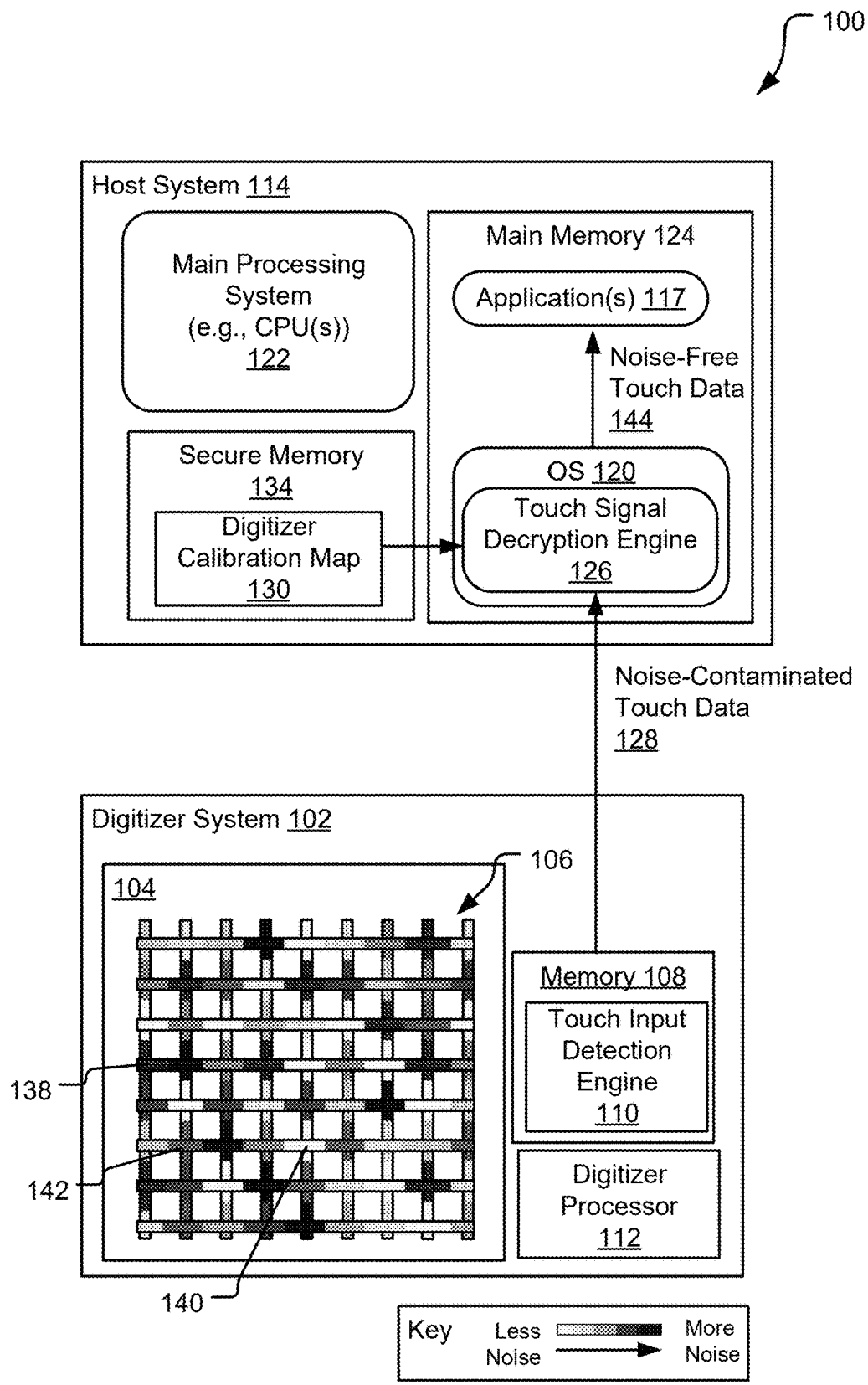
FIG. 1 illustrates an example processing device that implements operations to securely transport touch data corresponding to inputs received at a touch-sense surface.

In touch devices, the term "digitizer sensor" is commonly used to refer to a grid-like mesh of electrical traces or antennas embedded within or below a surface that function to sense touch interactions with the surface. In modern devices, digitizer sensor systems are backed by various touch-sense technologies, including resistive, capacitive, and near-field imaging (NFI).

Resistive-based digitizer systems typically include a flexible transparent upper layer of conductive polyester plastic placed above a rigid lower layer of glass printed with transparent conductive traces. A thin insulating air gap separates the polyester plastic and the glass. A voltage is applied to one layer and sensed by the other. When a user presses on the touch-sense surface, the conductive polyester layer is forced to touch the conductive traces and complete a circuit, allowing the digitizer system to detect the pressure position and corresponding coordinates of the touch surface.

Capacitive digitizer systems are typically made with two conductive layers separated by an insulating layer, thus forming a structure that functions as a capacitor. Each of the conductive layers may be formed by a transparent substrate, e.g., glass or plastic, printed with patterns of conductive traces. When a user places a finger or stylus on or near a touch-sense surface, the electric field generated by current in the traces is altered by an amount that varies according to where the finger or stylus is located. The coordinates of the location touched are determined by a processor that interprets the changes in the electric fields of the touch surface. Capacitive-based touch systems can detect touch at more than one location concurrently. However, these systems do not work if touched with a plastic stylus because the plastic is an insulator, which does not affect or alter the electric field.

Near-field imaging (NFI) digitizer systems work similarly to capacitive digitizer systems by monitoring changes in the electric fields generated by signals coursing through antenna structures formed within the digitizer. As a user moves a stylus or finger closer to the surface of the touchscreen, the electric field changes, which is registered as a touch. NFI touchscreens can detect touches from both conductive and non-conductive materials.

In all the above types of digitizer systems, the digitizer sensor is commonly part of a device subsystem that includes local memory and a processor or microprocessor (referenced herein as "digitizer processor") that performs some initial signal processing before transmitting touch signals to a central processing system (e.g., central processing unit (CPU)) of a host device). For example, the processor of the digitizer sensor converts a time-sampled touch surface signal at each of a plurality of detection points into the Fourier domain (frequency domain) to determine signal amplitude of target frequenc(ies) at each detection point. The resulting (frequency domain) dataset is then used to construct a "heat map" corresponding to the surface area of the touch surface. Following heat map construction, the heat map is calibrated to remove noise, which yields a meaningful heat map (e.g., image representation) that shows where touch has been detected on the touch surface and the strength of the touch in each location. Following this, the calibrated heat map is input to one or more image processing algorithms that translate the calibrated heatmap into coordinates (e.g., of finger touch) on the touch surface.

In some systems, the digitizer processor performs all the above-described processing. Thus, when the touch data arrives in main memory of the host device, it is already in a coordinate-based format that is interpretable to applications executing on an operating system (OS) of the host device.

The above-described practice gives rise to a security loophole. That is, if a malicious party was able to acquire access to the digitizer system (e.g., by altering a firmware update to include malware) or otherwise intercept the touch data in route as it leaves the digitizer system, the malicious party could potentially decipher where on the screen the user clicked and obtain sensitive information such as pins, passwords, and other user data. One possible solution to address this security loophole is to use the digitizer processor to encrypt the touch data and transmit the touch data to the host system in an encrypted format. However, common encryption schemes entail processing on both ends—e.g., encrypting at the source using an encryption key, transmitting to the destination, and decrypting at the destination using a decryption key. Each instance of encryption and decryption contributes, at least marginally, to the end-to-end latency of the touch system. Latencies are particularly undesirable in touch systems because delays between the provisioning of touch inputs and corresponding on-display responses (e.g., cursor movement, icon selection) are highly noticeable and bothersome to end users. Consequently, touch-sense systems are typically held to stringent latency standards to ensure the highest possible system response to touch inputs. Therefore, the increased latency associated with data encryption serves to deter the practice of encrypting touch data that is en route from a digitizer processor to a host main processor.

In addition to latency, common encryption/decryption schemes have other disadvantages, including resource consumption associated with storing encryption and description key pairs and undesirable power consumption to support the storage and encrypting/decrypting operations.

The herein-disclosed technology provides a methodology to secure the transmission of touch data from a digitizer processor to a main processor (e.g., of a host device) without relying on a traditional encryption/decryption scheme. Per the herein-disclosed technology, touch data is not encrypted before transmission by the digitizer processor and is, instead, transmitted from the digitizer processor in the form of an uncalibrated heat map that is undecipherable if nefariously intercepted due to the presence of device-specific "noise" that is, by design, not corrected for (e.g., filtered out) at the transmission source, as in previously-existing systems. The noise correction (e.g., heat map calibration) is, in the disclosed technology, intentionally displaced from the digitizer system to the host system (main processor), and this facilitates secure data transmission without a corresponding increase in processing load, latency, storage cost, or power consumption.

FIG. 1 illustrates an example computing device 100 that implements operations to securely transport touch data corresponding to touch input received at a touch-sense surface 104. The touch-sense surface 104 is part of a digitizer system 102 designed to receive and detect user-provided touch inputs via a digitizer sensor 106 embedded within or below the touch-sense surface 104. For example, the touch-sense surface 104 is a touchscreen display or a trackpad that receives touch inputs via a user's finger or a stylus. In FIG. 1, the touch-sense surface 104 is transparent to illustrate aspects of the digitizer sensor 106, including a mesh of electrical traces or antennas. In an implementation that employs resistive touch-sense technology, the digitizer sensor 106 includes contact traces on a glass substrate designed to connect to an upper conductive polyester layer under pressure. In an implementation that employs capacitive touch-sense technology, the digitizer sensor 106 includes conductive traces on opposing surfaces of a capacitive touch interface. In an implementation that employs NFI touch-sense technology, the digitizer sensor 106 includes conductive antenna traces. For this disclosure, the term "digitizer sensor" is intended to reference the conductive traces in any of the above-referenced touch sensor technologies.

The digitizer sensor 106 is electrically coupled to local control electronics, including a digitizer processor 112 (e.g., a processor or microprocessor) and memory 108 storing "touch input detection engine 110" (e.g., firmware) that is executable by the digitizer processor 112. In one implementation, the memory 108 and digitizer processor 112 are co-located on a printed circuit board assembly (PCBA) or integrated circuit chip (ICC) that further includes the digitizer sensor 106, and that is separate from another PCBA (e.g., motherboard) in a same device that supports a central processing system and main memory. In other implementations, the digitizer processor 112, memory 108, and digitizer sensor 106 are located on the motherboard of a processing device that also includes a main memory and CPU.

In some implementations, the touch input detection engine 110 may perform low-level hardware control and signal processing of touch inputs before transmitting those inputs to a host system 114. For example, the digitizer system 102 receives time-sampled inputs from the digitizer sensor 106 and performs a discrete Fourier transform (DFT) to extract amplitudes (indicative of touch "strength") at a plurality of detection locations. As discussed below, various remaining processing tasks—including noise calibration—are offloaded to a main processing system 122 of the processing device 100. The touch input detection engine 110 transmits noise-contaminated touch data 128 to the main memory 124 of a host system 114. In one implementation, the noise-contaminated touch data 128 includes a heat map (e.g., a 2D image corresponding to the touch-sense surface) that has not yet been calibrated to remove noise.

In FIG. 1, the host system 114 is within the same processing device (e.g., the processing device 100), including the digitizer system 102. For example, the processing device 100 is a personal electronic device such as a tablet, laptop, or smartphone. The digitizer system 102 includes a touch-sense surface (e.g., touchscreen or trackpad) and a corresponding controller that performs some local signal processing on touch inputs before the touch inputs are conveyed to main memory accessible by the central processing unit (CPU) of the personal electronic device. In another implementation, the digitizer system 102 is integrated within a device accessory separate from a device, including the host system 114. For example, the digitizer system 102 is integrated into a drawing pad accessory communicatively coupled to the host system 114 via a wireless or wired connection (e.g., universal serial bus (USB) or other suitable protocol).

The host system 114 includes a main processing system 122, e.g., one or more central processing unit(s), and main memory 124 accessible to the main processing system 122. The main memory 124 stores an operating system (OS) 120 and the various applications 117 executed on the OS 120.

In FIG. 1, the OS 120 is shown to include a touch input signal decryption engine 126, which is to be understood as a software component executable by the main processing system 122. In other implementations, the touch input signal decryption engine 126 is an application executed by the OS 120 instead of a component of the OS 120. The touch input signal decryption engine 126 performs various signal processing operations on the noise-contaminated touch data 128 received from the digitizer system 102, including noise calibration and translation of a calibrated heat map into corresponding coordinates of detected touch.

In one implementation, the noise-contaminated touch data 128 includes a heat map contaminated with a baseline noise distribution attributable to unique hardware characteristics and imperfections of the digitizer sensor 106. This baseline noise distribution is referred to herein as a "noise signature" of the digitizer sensor 106. Every heat map generated from raw measurements of the digitizer sensor 106 includes its characteristic noise signature. Different instances of digitizer sensor 106 have different noise signatures, even those with identical hardware specifications and integrated within identical host devices.

In one implementation, each instance of the digitizer system 102 is subjected to testing, e.g., in a factory setting, to identify its corresponding noise signature and to develop a digitizer calibration map 130 that can be used, in-the-field, to remove or substantially remove the noise signature from measurements detected by the digitizer system 102 and thereby allow meaningful touch signals (e.g., touch detection points) to be extracted from the underlying noise-free signal. As used herein, noise is said to be "substantially removed" from a touch signal when accurate touch coordinates can be extracted from the touch signal without first requiring further calibrations to reduce noise. In this sense, "accurate touch coordinates" refers to touch coordinates within acceptable error margin specifications for common touch-sense devices.

For example, the digitizer calibration map 130 is generated by first detecting a time-sampled signal across all detection points of the digitizer sensor 106 when there is no physical contact between the touch-sense surface and the user or external objects. This time-sampled signal is then transformed into the frequency domain (e.g., by performing a DFT) to extract "touch amplitude" at each detection point. The digitizer calibration map 130 visually represents these extracted amplitudes at the corresponding detection points.

In FIG. 1, the digitizer sensor 106 is illustrated in various shades of grayscale to simulate the noise signature of the digitizer sensor 106. In this illustration, different shades of grayscale indicate variations in noise that may exist at different detection points (e.g., detection points 138, 140, 142) on the traces of the digitizer sensor 1006. As shown, some detection points are characterized by a greater magnitude of baseline noise (e.g., the detection point 138). In comparison, other detection points are characterized by a lesser magnitude of baseline noise (e.g., the detection point 140). The digitizer calibration map 130 represents a stored instance of the above-described noise signature and is usable to nullify (cancel out) the noise signature from the noise-contaminated touch data 128. For example, the noise-contaminated touch data 128 includes an array (e.g., an uncalibrated 2D heat map) that can be divided by the digitizer calibration map 130 to remove the noise signature of the digitizer sensor 106 yielding the identity matrix, which indicates a lack of contact with all detection points on the touch-sense surface 104.

In existing (e.g., conventional) touch systems, the digitizer calibration map 130 is stored in the memory 108 of the digitizer system 102. Before transmitting touch inputs to the host system 114, the digitizer system 102 generates a heat map and then calibrates the heat map by dividing it by the digitizer calibration map 130. The resulting "noise-free" data is then sent to the host system 114. The herein-proposed technology modifies this existing approach by altering the storage location of the digitizer calibration map 130 and offloading a portion of the touch data processing to the host system 114.

In the processing device 100, the digitizer calibration map 130 is stored in a secure memory region 134 of the host system 114 rather than on the digitizer system 102. The main processing system 122 (e.g., CPU) of the host system 114 uses the digitizer calibration map 130 to at least substantially remove noise from the noise-contaminated touch data 128, which can be understood as a stream of touch data inputs that includes uncalibrated heat maps corresponding to different instances in time. In one implementation, the secure memory region 134 is accessible to the OS 120 but not to the applications 117 executing on the OS 120 or other peripheral devices or OS-level drivers. For example, the secure memory region 134 is a protected memory area within a trusted execution environment (TEE) that the OS 120 uses to store encryption/decryption keys, ensuring that the keys are not accessible to applications or other system components. Storing the digitizer calibration map 130 in the secure memory region 134 ensures that the noise-contaminated touch data 128 remains undecipherable to all processors except the main processing system 122, which provides the touch coordinates to the various OS-level applications.

After using the digitizer calibration map 130 to substantially remove the noise signature of the digitizer sensor 106 from the noise-contaminated touch data 128, the touch signal decryption engine 126 performs final signal processing operations, such as by employing one or more algorithms to extract, from the calibrated touch data, coordinates that a user interacted with on the touch surface 104. This final processed touch data (e.g., sequences of X/Y coordinates) is then made available to operating system application(s) 117, as shown in FIG. 1 by "noise-free touch data 144."

The above-described displacement of the calibration map and delegation of noise calibration operations to the host system 114 leverages the unique noise signature of the digitizer sensor 106 as a form of encryption. In common applications of touch-sense technology, the noise values in the digitizer calibration map 130 may be orders of magnitude larger than the range of values expected in the touch data signal when touch is detected. Consequently, the "noise" in the noise-contaminated touch data 128 functions to completely mask the underlying signal, meaning—the noise-contaminated touch data 128 would be undecipherable to any entity that acquired access to the digitizer system 102 or the transmission line between the digitizer system 102 and the host system 114. Thus, the noise-contaminated touch data 128 is afforded the same security protections as encrypted data generated and transmitted according to commonly practiced encryption schemes, with the digitizer calibration map 130 functioning as a unique decryption key for the digitizer system 102.

As a result of the above-described operations, touch data is securely transmitted to the host system 114 without being subjected to encryption operations affirmatively performed by the digitizer system 102. This improves user data security compared to systems that use the digitizer processor 112 to remove baseline signal noise. Further, this technique reduces processing overhead (and corresponding latency) compared to the processing overhead observed in otherwise identical systems that employ encryption/decryption to protect touch data in transit between the digitizer system 102 and the host system 114.

Figure 2:
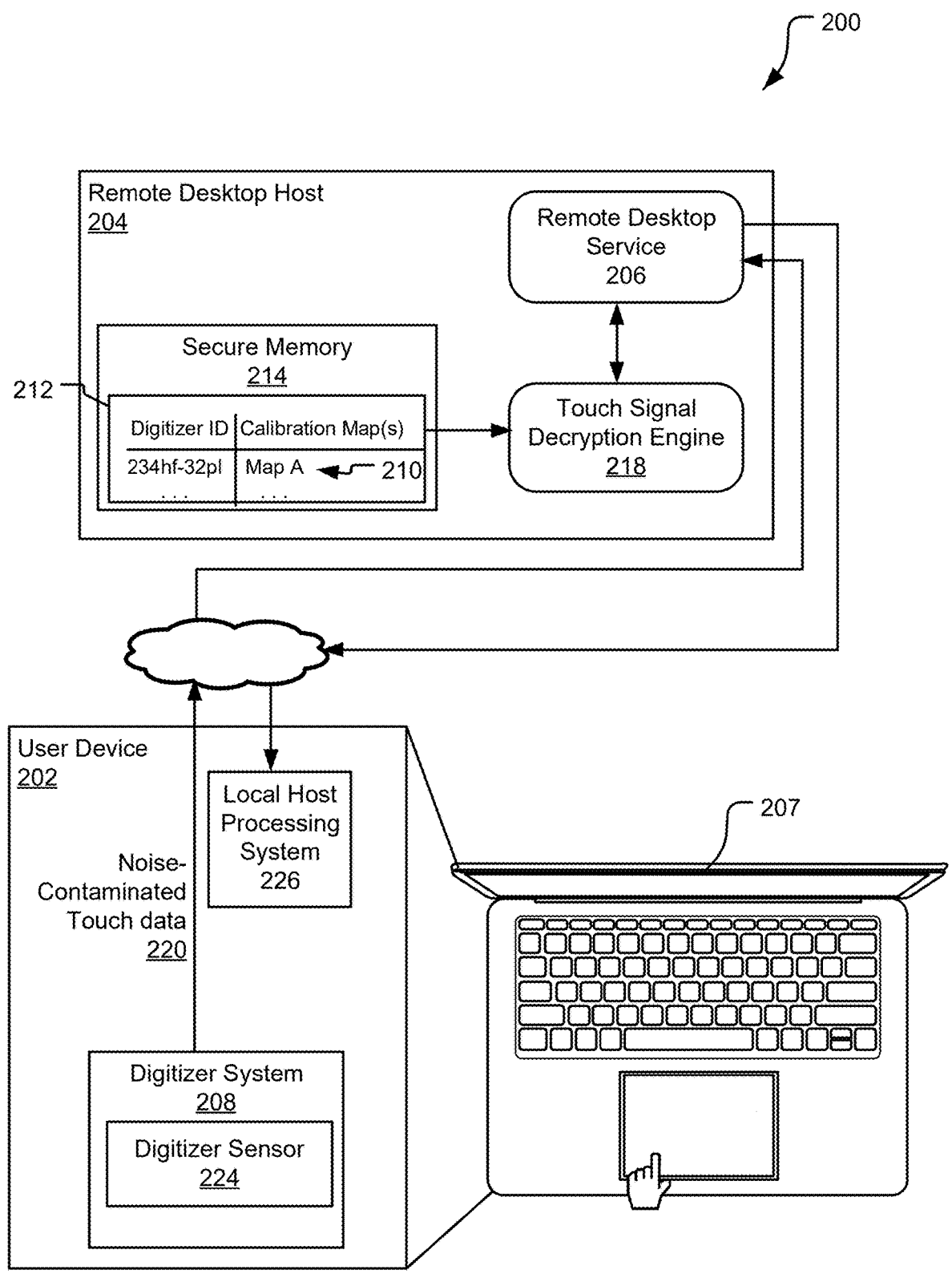
FIG. 2 illustrates another example system that implements safeguards to protect touch data in transit to a host processing system.

FIG. 2 illustrates another example, system 200, which implements the herein-disclosed technology to enhance the security of touch data in transit to a host processing system. In the system 200, touch inputs are transmitted between a user device 202 and a remote desktop host 204, which provides the user device 202 with a remote desktop service 206. For example, the remote desktop service 206 is an application executed by a virtual machine (VM) that is physically hosted by a server residing at a data center remote to the user device 202.

During the remote desktop session, the remote desktop host 204 generates graphics content and transmits the graphics content in the form of a stream of images to the user device 202. A GPU (not shown) on the user device 202 renders the graphics to a local display 207. A user interacts with the user device 202 to provide application inputs (e.g., mouse inputs, keypad inputs, trackpad inputs, touchscreen inputs) that are, in turn, transmitted to the remote desktop host 204, processed on the remote desktop host 204, and used to update (alter) the graphics content generated by the remote desktop service 206. The remote desktop host 204 then transmits the updated graphics content back to the user device 202, where the local GPU then renders the updated graphics content to the display 207.

During the above-described remote desktop session, the user provides at least some touch data to a digitizer system 208 of the user device 202. The digitizer system 208 may include the same or similar components as those described with respect to the digitizer system 102 of FIG. 1, including a digitizer sensor 224. The digitizer sensor 224 has a unique pattern (signature) of baseline noise that is present in measurements collected by the digitizer sensor 224, as generally described with respect to FIG. 1. During factory calibration, the unique pattern of baseline noise is measured and captured in a digitizer calibration map 210 ("Map A"). In the system 200, the digitizer calibration map 210 is stored in a table 212 that resides in a secure memory region 214 of the remote desktop host 204.

At the commencement of the remote desktop session, the remote desktop host 204 initiates an authentication sequence to authenticate the user device 202 and/or a user that supplies credentials (e.g., username, password) to the user device 202 in association with a request to launch a remote desktop session. During this authentication, the remote desktop service 206 obtains an identifier from the user device 202, and that identifier is passed to a touch signal decryption engine 218 (e.g., an application or operating system component) executing on the remote desktop host 204. The touch signal decryption engine 218 uses this identifier to identify the digitizer calibration map in the table 212 that corresponds to the digitizer sensor 224 in the user device 202. This map is then selected for use in touch data decryption operations for the duration of the remote desktop session.

During the remote desktop session, the remote desktop service 206 receives uncalibrated (noise-contaminated) touch data, shown in FIG. 2 as "noise-contaminated touch data 220," and offloads processing of this data to the touch signal decryption engine 218. The touch signal decryption engine 218, in turn, uses the digitizer calibration map 210 to at least substantially remove the unique baseline noise signature of the digitizer sensor 224 from the noise-contaminated touch data 220. Since the noise signature of the digitizer sensor 224 includes a unique distribution of noise values potentially several times larger in magnitude than the underlying touch signal, the noise-contaminated touch data 220 cannot be deciphered without the use of the digitizer calibration map 210. Thus, the touch data inputs remain secure even if intercepted en route to the remote desktop host 204.

In FIG. 2, the digitizer system 208 transmits the noise-contaminated touch data 220 to the remote desktop host 204 along a channel that bypasses a local host processing system 226 within the user device 202. In another implementation, the noise-contaminated touch data 220 is transmitted to the local host processing system 226 before leaving the user device 202; however, the touch inputs are not subject to calibration or noise removal on the user device 202 and are instead transmitted in a noisy format (e.g., stream of uncalibrated heat maps) to the remote desktop host 204.

Figure 3A:
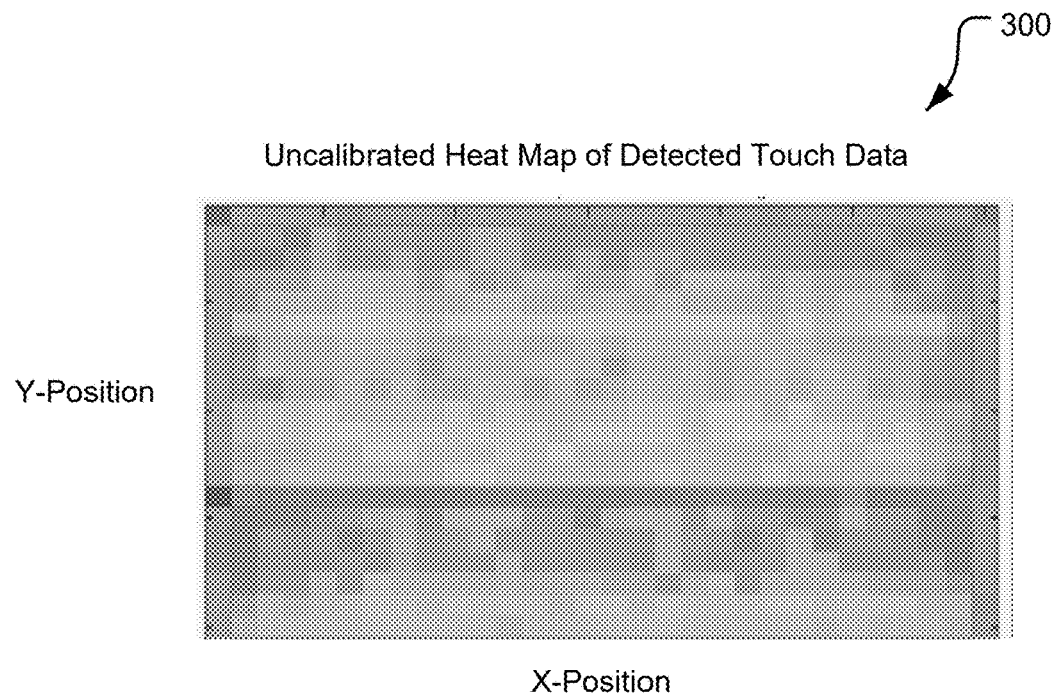
FIG. 3A illustrates an example of an uncalibrated heat map representing noise-contaminated touch data that is undecipherable without a corresponding digitizer calibration map.

FIG. 3A illustrates an example of an uncalibrated heat map 300 representing noise-contaminated touch data that is undecipherable without a corresponding digitizer calibration map. In one implementation, the uncalibrated heat map 300 is created by receiving a time-sampled signal for each of a plurality of detection points on a digitizer sensor and transforming the time-sampled signal at each detection point, into the frequency domain to extract an amplitude indicative of "strength" of the touch detected (e.g., no touch, light touch, firm touch). In one implementation, the uncalibrated heat map 300 is generated by the touch input detection engine 110 of FIG. 1, which resides in the firmware of a digitizer system. The digitizer sensor has a unique noise signature that is strong enough to mask meaningful characteristics of the underlying touch signal. Thus, it is not possible to extract the coordinates of the user touch without using a calibration map uniquely designed for the digitizer sensor to substantially remove the unique noise signature of the digitizer sensor from the touch signal. In one implementation, a processor of a digitizer system transmits a series of time-sequential uncalibrated heat maps, similar to the uncalibrated heat map 300, to a processor of a host system. The host system securely stores the digitizer calibration map (e.g., a key needed to decrypt the signal and extract meaningful features). Consequently, the digitizer calibration map is not accessible to the firmware of the digitizer system and cannot be exposed by malware inadvertently installed on the digitizer system.

Figure 3B:
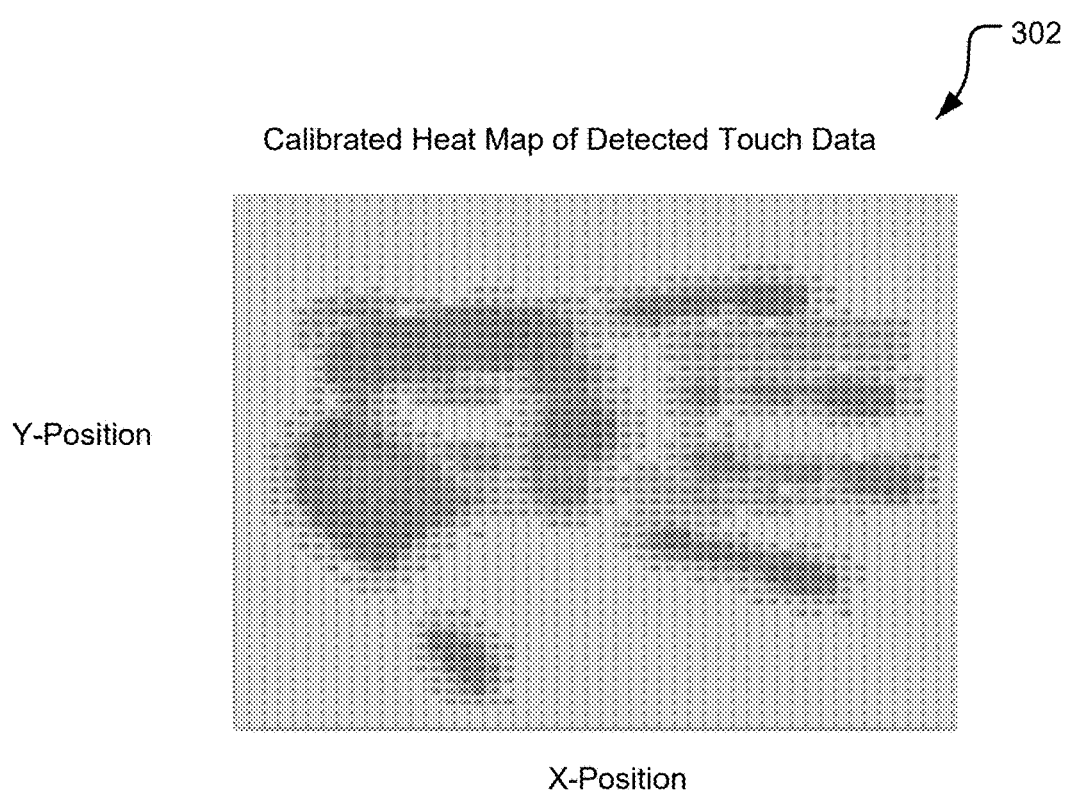
FIG. 3B illustrates an example of a calibrated heat map created by using a digitizer calibration map to filter noise from the uncalibrated heat map shown in FIG. 3A.

FIG. 3B illustrates an example of a calibrated heat map 302 created using a digitizer calibration map to filter noise from the uncalibrated heat map 300 of FIG. 3A. In one implementation, the calibrated heat map 302 is created by dividing the uncalibrated heat map 300 of FIG. 3A by a digitizer calibration map storing a unique noise signature of the digitizer sensor used to create the dataset represented by the heat map. Stated differently, the digitizer calibration map serves as a unique key that is usable to decrypt the touch signal. As shown, the calibrated heat map 302 illustrates locations a user's hand touched, with "strength of touch" indicated by the mapped amplitudes. In a system employing the herein-disclosed technology, a host processing system receives the uncalibrated heat map 300, accesses the corresponding, securely stored digitizer calibration map, and divides the uncalibrated heat map 300 by the digitizer calibration map to yield the uncalibrated heat map 300.

Figure 4:
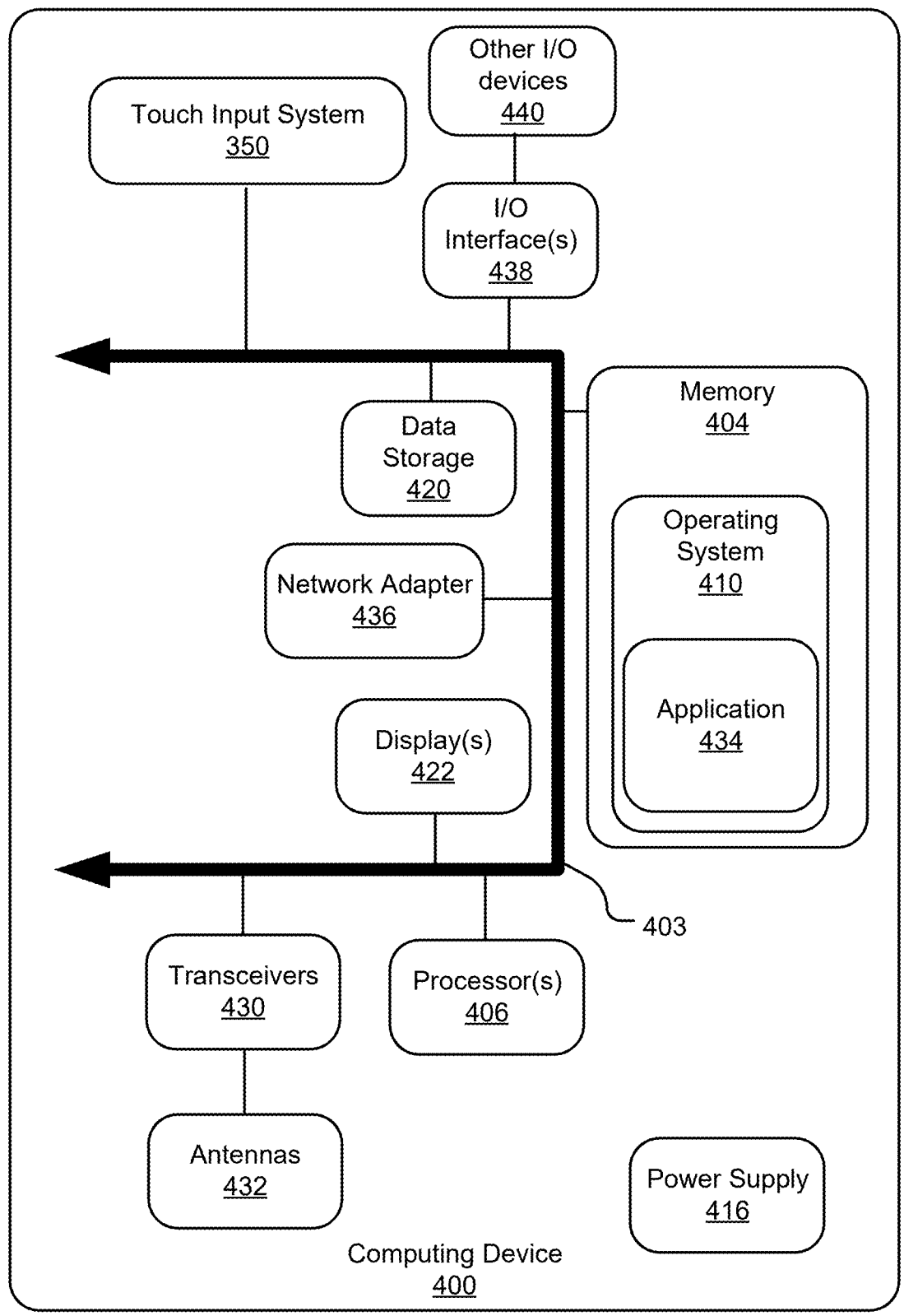
FIG. 4 illustrates examples of hardware and software that can be useful in implementing the described technology in a computing device.

FIG. 4 illustrates example hardware and software that can be useful in implementing the described technology in a computing device 400. The computing devices disclosed herein may be network-connected and/or network-capable devices and may be client devices, such as game consoles, laptops, mobile devices, desktops, tablets, server/cloud devices, internet-of-things devices, electronic accessories, or other electronic computing devices, for example.

The computing device 400 includes a system board upon which a variety of microelectronic components for the device are attached and interconnected via a communication backbone 403. For example, the system board may include one or more processors 406 (e.g., discrete or integrated microelectronic chips and/or separate but integrated processor cores, including but not limited to central processing units (CPUs) and graphic processing units (GPUs)) and at least one memory device 404, which may be integrated into systems or chips of the device. The computing device 400 may also include data storage 420 (e.g., a flash or hard disk drive), one or more display(s) 422, a touch input system 450 that includes a digitizer sensor, and other input/output (I/O) devices 440.

The touch input system 450 converts physical user inputs into corresponding electrical signals that may be interpreted by the computing device 400 and rendered on the display(s) 422. The touch input system includes at least a printed circuit board assembly with an associated digitizer sensor (not shown, see, e.g., digitizer sensor 106 of FIG. 1). The touch input system 450 is connected to the computing device 400 via a wired or wireless connection and can be integrated with various operating systems (such as operating system 410) and software applications (such as application 434).

In some implementations, the touch input system 450 includes a microprocessor and firmware that performs preliminary signal processing on raw touch data to prepare the raw touch data for transmission to memory 404, accessible by the operating system 410 and applications 434. The operating system 410 or applications 434 may include a touch input signal decryption engine (e.g., the touch input signal decryption engine 126) that receives or accesses noise-contaminated touch data from the touch input system 450. A digitizer calibration map (not shown) may also be stored in the memory 404 and used by a touch input signal decryption engine to remove a unique noise signature of a digitizer sensor from the nose-contaminated touch data.

Other I/O devices 440 may permit a user to enter commands and information (e.g., via a game controller, keyboard, or mouse). These and other input devices may be coupled to the computing device 400 by one or more I/O interfaces 438, such as a serial port interface, parallel port, and/or universal serial bus (USB).

The memory device(s) 404 and/or the data storage 420 may include one or both volatile memory (e.g., random-access memory (RAM)) and non-volatile memory (e.g., flash memory or magnetic storage). An operating system 410, such as one of the varieties of the Microsoft Windows® operating system, resides in the memory device(s) 404 and/or the data storage 420 and is executed by at least one of the processor(s) 406, although other operating systems may be employed. Other software applications, such as application 434, may also be loaded into memory device(s) 404 and/or data storage 420 and executed within the operating system 410 by at least one of the processor(s) 406.

The computing device 400 may further include a (or be connected to an external) power supply 416, which is powered by one or more batteries or other power sources and provides power to the computing device 400. The power supply 416 may also be connected to an external power source that overrides or recharges the batteries.

The computing device 400 may further include one or more communication transceivers 430, which may be connected to one or more antenna(s) 432 to provide network connectivity (e.g., mobile phone network, Wi-Fi®, Bluetooth®) to one or more other servers and/or client devices (e.g., mobile devices, desktop computers, or laptop computers) within a wireless network. The computing device 400 may further include a network adapter 436, which is a type of communication interface. The computing device 400 may use the network adapter 436 and any other types of communication devices for establishing connections over a data network, such as a wide-area network (WAN such as the IP Networks disclosed herein) or local-area network (LAN). The network connections shown are exemplary, and other communication devices and mechanisms for establishing communications links between computing devices and their respective LAN/WAN network(s) and/or IP Network(s) are contemplated herein.

The computing devices disclosed herein may include a variety of tangible computer-readable storage media (e.g., the memory device(s) and the storage media device(s)) and intangible computer-readable communication signals. Tangible computer-readable storage can be embodied by any available media that can be accessed by the computing devices and includes both volatile and non-volatile storage media, as well as removable and non-removable storage media implemented in any method or technology for storage of information such as computer-readable instructions, data structures, program modules or other data. Tangible computer-readable storage media includes but is not limited to RAM, read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other tangible medium which can be used to store the desired information and which can be accessed by the computing devices. Tangible computer-readable storage media excludes intangible communications signals.

Intangible computer-readable communication signals may embody computer-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared (IR), and other wireless media.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, to instruct a computer to perform a certain operation segment. The instructions may be implemented using any suitable high-level, low-level, object-oriented, visual, compiled, and/or interpreted programming language.

Figure 5:
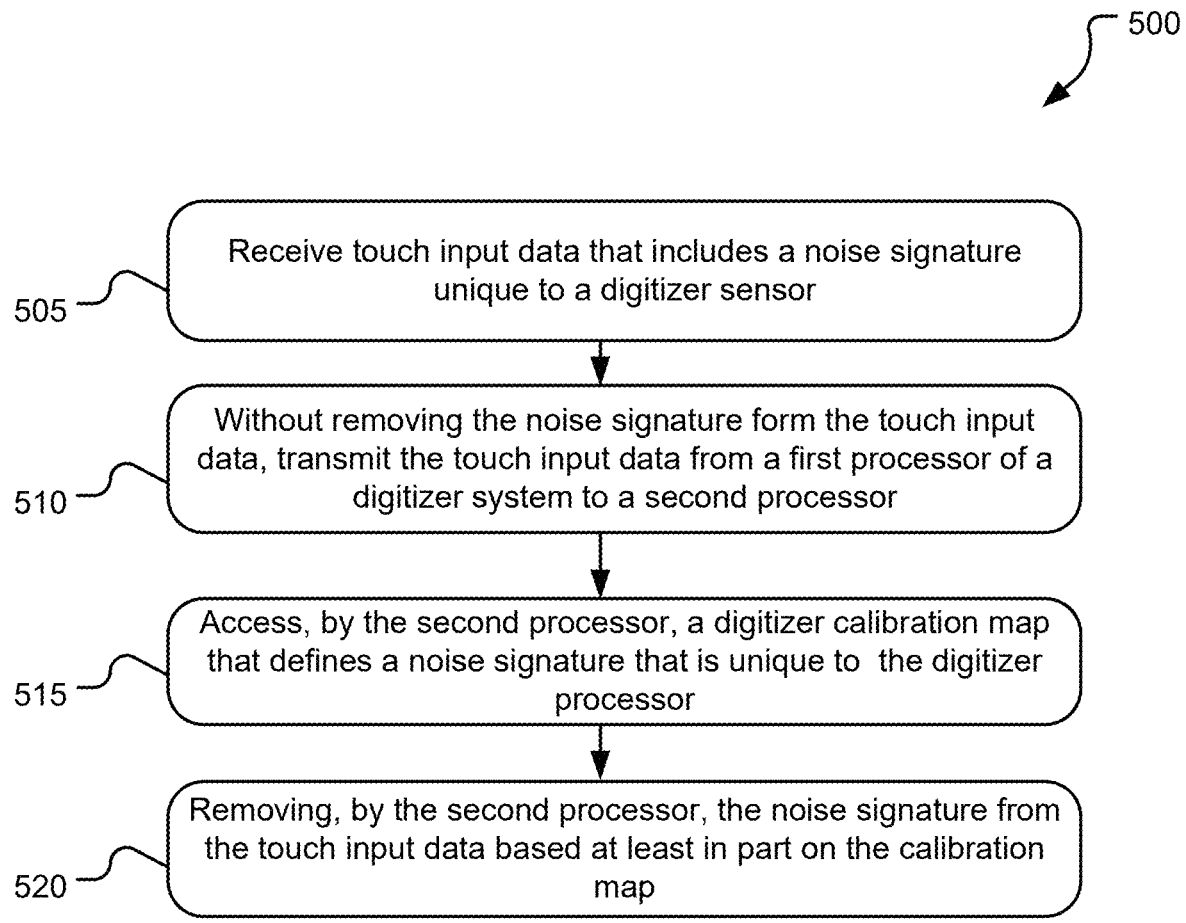
FIG. 5 illustrates example operations for securely transmitting touch data detected by a digitizer sensor to a host processing system.

FIG. 5 illustrates example operations 500 for securely transmitting touch data detected by a digitizer sensor to a host processing system. A receiving operation 505 receives touch data from a digitizer sensor in response to a user interaction with a touch surface. The touch data includes a noise signature unique to the digitizer sensor.

A transmission operation 510 transmits the touch data from the first processor of the digitizer system to a second processor of a host device. In some implementations, the touch data is subject to preliminary processing before the transmission operation. For example, the first processor of the digitizer system performs a discrete Fourier transform and generates a heat map. The first processor does not, however, calibrate the heat map to remove baseline noise attributable to the hardware characteristics of the digitizer sensor.

In one implementation, the second processor is the CPU of the host device. For example, transmitting the touch data includes storing the touch data within a main memory of the host device that is accessible to the CPU of the host device.

Following the transmission operation 510, the second processor performs a calibration map access operation 515 and a calibration operation 520. The calibration map access operation 515 includes accessing a secure memory region of the host device that stores a digitizer calibration map defining a noise signature unique to the digitizer processor. The calibration operation 520 calibrates the touch data by removing the noise signature from the touch data based at least in part on the digitizer calibration map.

In some aspects, the techniques described herein relate to a system for securely transmitting touch data, the system including: a digitizer sensor to output touch data in response to a user interaction with a touch surface, the digitizer sensor having a unique noise signature that is detectable in measurements of the digitizer sensor; a touch input detection engine to: receive, from the digitizer sensor, the touch data that includes the unique noise signature of the digitizer sensor; and transmit the touch data including the unique noise signature to a host system; a digitizer calibration map uniquely associated with the digitizer sensor that is stored in a secure memory region of the host system; and a touch input signal decryption engine executed by a processor of the host system to use the digitizer calibration map to substantially remove the unique noise signature of the digitizer sensor from the touch data.

In some aspects, the techniques described herein relate to a system, wherein the unique noise signature renders the touch inputs undecipherable to processing entities that lack access to the digitizer calibration map.

In some aspects, the techniques described herein relate to a system, wherein the digitizer calibration map defines a distribution of noise measured across a plurality of detection points of the digitizer sensor at a time when no touch input is provided to the touch surface.

In some aspects, the techniques described herein relate to a system, wherein the touch input detection engine resides in firmware of a digitizer system and wherein the touch data is not subjected to calibration or encryption by the digitizer system.

In some aspects, the techniques described herein relate to a system, wherein the touch input signal decryption engine is executed by a central processing unit (CPU) of the host system, and wherein the touch input signal decryption engine provides the touch data to an application executing on an operating system of the host system after removing the unique noise signature from the touch data.

In some aspects, the techniques described herein relate to a system, wherein the processor of the host system is a central processing unit (CPU) and the touch input detection engine is executed by a separate processor.

In some aspects, the techniques described herein relate to a system, wherein the secure memory region of the host system is inaccessible to applications executed by an operating system of the host system.

The above specification, examples, and data provide a complete description of the structure and use of exemplary implementations of the presently disclosed technology. Since many implementations can be made without departing from the spirit and scope of the forgoing disclosure, the scope is defined by the claims hereinafter appended and any equivalents thereto. Furthermore, structural features of the different implementations may be combined in yet another implementation without departing from the recited claims.

What is claimed is:

1. A system for securely transmitting touch data, the system comprising:
   a digitizer sensor to output touch data in response to a user interaction with a touch surface, the digitizer sensor having a unique noise signature that is detectable in measurements of the digitizer sensor;
   a touch input detection engine to:
      receive, from the digitizer sensor, the touch data that includes the unique noise signature of the digitizer sensor; and
      transmit the touch data including the unique noise signature to a host system;
   a digitizer calibration map uniquely associated with the digitizer sensor that is stored in a secure memory region of the host system; and
   a touch input signal decryption engine executed by a processor of the host system to use the digitizer calibration map to substantially remove the unique noise signature of the digitizer sensor from the touch data.

2. The system of claim 1, wherein the unique noise signature renders the touch inputs undecipherable to processing entities that lack access to the digitizer calibration map.

3. The system of claim 1, wherein the digitizer calibration map defines a distribution of noise measured across a plurality of detection points of the digitizer sensor at a time when no touch input is provided to the touch surface.

4. The system of claim 1, wherein the touch input detection engine resides in firmware of a digitizer system and wherein the touch data is not subjected to calibration or encryption by the digitizer system.

5. The system of claim 1, wherein the touch input signal decryption engine is executed by a central processing unit (CPU) of the host system, and wherein the touch input signal decryption engine provides the touch data to an application executing on an operating system of the host system after substantially removing the unique noise signature from the touch data.

6. The system of claim 1, wherein the processor of the host system is a central processing unit (CPU) and the touch input detection engine is executed by a separate processor.

7. The system of claim 1, wherein the secure memory region of the host system is inaccessible to applications executed by an operating system of the host system.

8. A method comprising:
receiving, from a digitizer sensor, touch data corresponding to a user interaction with a touch surface, the touch data including a noise signature that is unique to the digitizer sensor;
without removing the noise signature, transmitting the touch data from a first processor of a digitizer system to a second processor of a host system;
accessing, by the second processor, a digitizer calibration map that defines the noise signature of the digitizer sensor; data; and
substantially removing, by the second processor, the noise signature from the touch data based at least in part on the digitizer calibration map.

9. The method of claim 8, wherein the first processor is located on a printed circuit board assembly (PCBA) including the digitizer sensor and the second processor is a central processing unit (CPU) of a host device that includes the PCBA.

10. The method of claim 8, wherein the digitizer calibration map defines a distribution of noise measured across a plurality of detection points of the digitizer sensor at a time when no touch input is provided to the touch surface.

11. The method of claim 8, wherein the touch data includes a distribution of measurements corresponding to different detection points of the digitizer sensor, and wherein substantially removing the noise signature from the touch data includes dividing the distribution of measurements by the digitizer calibration map.

12. The method of claim 8, wherein the noise signature renders the touch data undecipherable to processing entities that lack access to the digitizer calibration map.

13. The method of claim 8, further comprising:
after substantially removing the noise signature from the touch data, providing the touch data to an application executed by the second processor.

14. The method of claim 8, wherein the touch data is not subjected to calibration by the first processor.

15. The method of claim 9, wherein PCBA includes a memory storing firmware and the firmware lacks access to the digitizer calibration map.

16. A method of configuring a processing device to securely transmit touch inputs between a digitizer system and a host system, the method comprising:
measuring, during a factory calibration, noise at a plurality of detection points of a digitizer sensor;
generating a digitizer calibration map defines a distribution of the noise at the plurality of detection points; and
storing the digitizer calibration map in a secure memory region that is accessible to a central processing unit (CPU) of the host system; and
loading into main memory of the host system a touch input signal decryption engine executable to utilize the digitizer calibration map to substantially remove a noise signature from noise-contaminated touch data received from the digitizer system.

17. The method of claim 16, further comprising;
loading firmware into a memory of the digitizer system, the firmware being executable to transmit the noise-contaminated touch data to the host system without first performing a calibration to substantially remove the noise.

18. The method of claim 16, wherein the noise-contaminated touch data includes a distribution of measurements corresponding to different detection points of the digitizer sensor, and wherein the touch input signal decryption engine substantially removes the noise signature from the touch inputs by dividing the distribution of measurements by the digitizer calibration map.

19. The method of claim 16, wherein the digitizer system includes a memory storing firmware that is separate from the main memory of the host system, and wherein the firmware lacks access to the digitizer calibration map.

20. The method of claim 16, wherein the host system incorporated into a host device different from a device that includes the digitizer system.

* * * * *